US012654693B2

(12) United States Patent
Nishijima

(10) Patent No.: US 12,654,693 B2
(45) Date of Patent: Jun. 16, 2026

(54) DRIVING ASSISTANCE DEVICE

(71) Applicant: TOYOTA JIDOSHA KABUSHIKI KAISHA, Aichi (JP)

(72) Inventor: Masakazu Nishijima, Ebina (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 42 days.

(21) Appl. No.: 18/746,038

(22) Filed: Jun. 18, 2024

(65) Prior Publication Data

US 2024/0425040 A1 Dec. 26, 2024

(30) Foreign Application Priority Data

Jun. 22, 2023 (JP) ................................ 2023-102189

(51) Int. Cl.
| | |
|---|---|
| *B60W 30/09* | (2012.01) |
| *B60W 10/18* | (2012.01) |
| *B60W 10/20* | (2006.01) |
| *B60W 50/14* | (2020.01) |

(52) U.S. Cl.
CPC ............ *B60W 30/09* (2013.01); *B60W 10/18* (2013.01); *B60W 10/20* (2013.01); *B60W 50/14* (2013.01); *B60W 2420/403* (2013.01); *B60W 2554/4029* (2020.02)

(58) Field of Classification Search
None
See application file for complete search history.

(56) References Cited

U.S. PATENT DOCUMENTS

| | | | |
|---|---|---|---|
| 8,954,252 B1 * | 2/2015 | Urmson ................. | G08G 1/167 |
| | | | 701/301 |
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 * | 10/2020 | Kaminade .............. | B60Q 9/008 |
| 2019/0146519 A1 * | 5/2019 | Miura ................... | B60W 30/09 |
| | | | 701/28 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2022/0270475 A1 * | 8/2022 | Sakurada .............. | G06V 40/25 |
| 2022/0402484 A1 * | 12/2022 | Mizoguchi ........ | B60W 30/0956 |
| 2025/0148917 A1 * | 5/2025 | Nishijima ............. | B60W 50/14 |

FOREIGN PATENT DOCUMENTS

| | | | |
|---|---|---|---|
| JP | 5004865 B2 | 8/2012 | |
| JP | 5063637 B2 | 10/2012 | |
| JP | 2022148428 A | * 10/2022 | |
| JP | 2023-002222 A | 1/2023 | |

* cited by examiner

*Primary Examiner* — Rachid Bendidi
*Assistant Examiner* — Nada Mahyoob Alqaderi
(74) *Attorney, Agent, or Firm* — HAUPTMAN HAM, LLP

(57) ABSTRACT

The driving assistance device comprises a pedestrian crossing detection unit that detects the pedestrian crossing length ahead of the host vehicle based on imaging information from a camera, a lane width acquisition unit that acquires the lane width of the own lane, and a driving assistance unit that calculates the reference pedestrian crossing length based on the lane width and performs driving assistance when the pedestrian crossing length is shorter than the reference pedestrian crossing length.

3 Claims, 6 Drawing Sheets

DRIVING ASSISTANCE DEVICE

CROSS-REFERENCE TO RELATED APPLICATIONS

This application is based upon and claims the benefit of priority from Japanese Patent Application No. 2023-102189, filed On Jun. 22, 2023, the entire contents of which are incorporated herein by reference.

BACKGROUND

Field

The present disclosure relates to a driving support device that performs driving assistance for a host vehicle.

Description of the Related Art

In the related art, a driving support device for vehicles provides driving assistance, such as deceleration, upon detecting a pedestrian or the like that is about to cross the pedestrian crossing. For example, Japanese Unexamined Patent Publication No. 2022-148428 describes that the presence or absence of a pedestrian in the vicinity of a pedestrian crossing is determined using a captured image of a camera mounted on a host vehicle and a captured image of an external camera, and driving support such as notification is performed.

SUMMARY

When the other vehicle exists in an adjacent lane adjacent to the own lane, a blind spot may occur due to the other vehicle. For this reason, it may be difficult to detect a pedestrian crossing or the like. In addition, although Japanese Unexamined Patent Publication No. 2022-148428 describes the use of an image captured by an external camera, it may be difficult to acquire such an image captured by an external camera.

Therefore, the present disclosure describes a driving support device capable of more appropriately performing driving support for a host vehicle before pedestrian crossing.

One aspect of the present disclosure is a driving assistance device for assisting the operation of a host vehicle traveling on an own lane adjacent to an adjacent lane. The driving assistance device comprises a pedestrian crossing detection unit that detects the length of a pedestrian crossing in an extending direction ahead of the host vehicle, referred to as the pedestrian crossing length, based on imaging information from a camera; a lane width acquisition unit that acquires the lane width of the own lane; and a driving assistance unit. The driving assistance unit calculates a reference pedestrian crossing length based on the acquired lane width. The driving assistance unit performs driving assistance when the detected pedestrian crossing length is shorter than the calculated reference pedestrian crossing length. The driving assistance may include at least one of notifying the occupants of the host vehicle, steering control of the host vehicle, and deceleration control.

The aforementioned driving assistance device further comprises a vehicle detection unit. The vehicle detection unit sets a vehicle detection area on the side of the own lane for detecting other vehicles. The vehicle detection unit detects the presence or absence of other vehicles within the set vehicle detection area. The vehicle detection unit detects the presence or absence of other vehicles within the vehicle detection area with speeds lower than a predetermined vehicle speed threshold. The driving assistance unit may perform driving assistance when another vehicle with a speed lower than the vehicle speed threshold is detected within the vehicle detection area and the detected pedestrian crossing length is shorter than the calculated reference pedestrian crossing length.

According to an aspect of the present disclosure, it is possible to more appropriately perform driving support of a host vehicle before pedestrian crossing.

DETAILED DESCRIPTION

Figure 1:
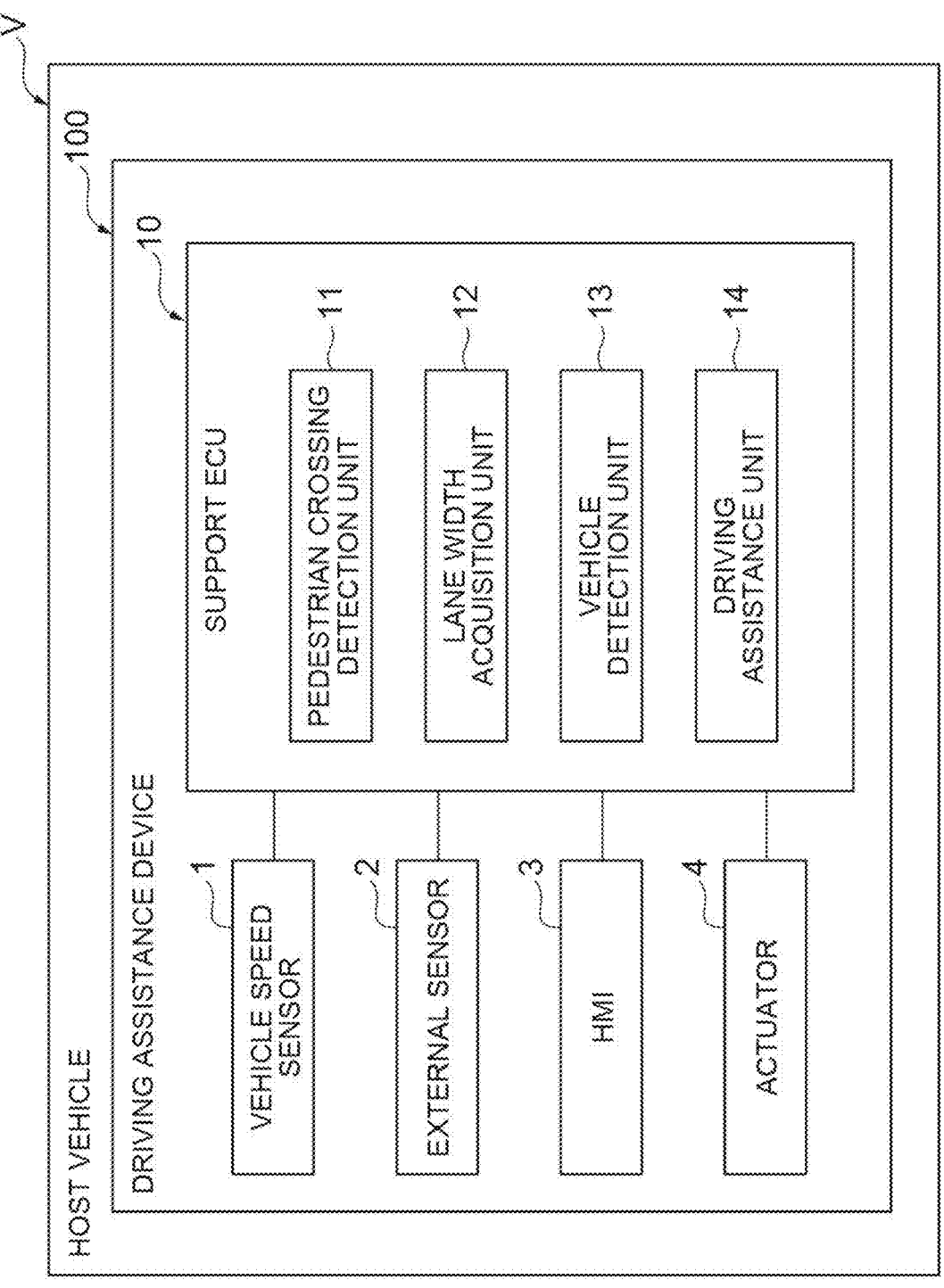
FIG. 1 is a block diagram illustrating an example of a driving support device according to an embodiment.

Hereinafter, exemplary embodiments will be described with reference to the drawings. In the drawings, the same or corresponding elements are denoted by the same reference numerals, and redundant description is omitted.

Figure 2:
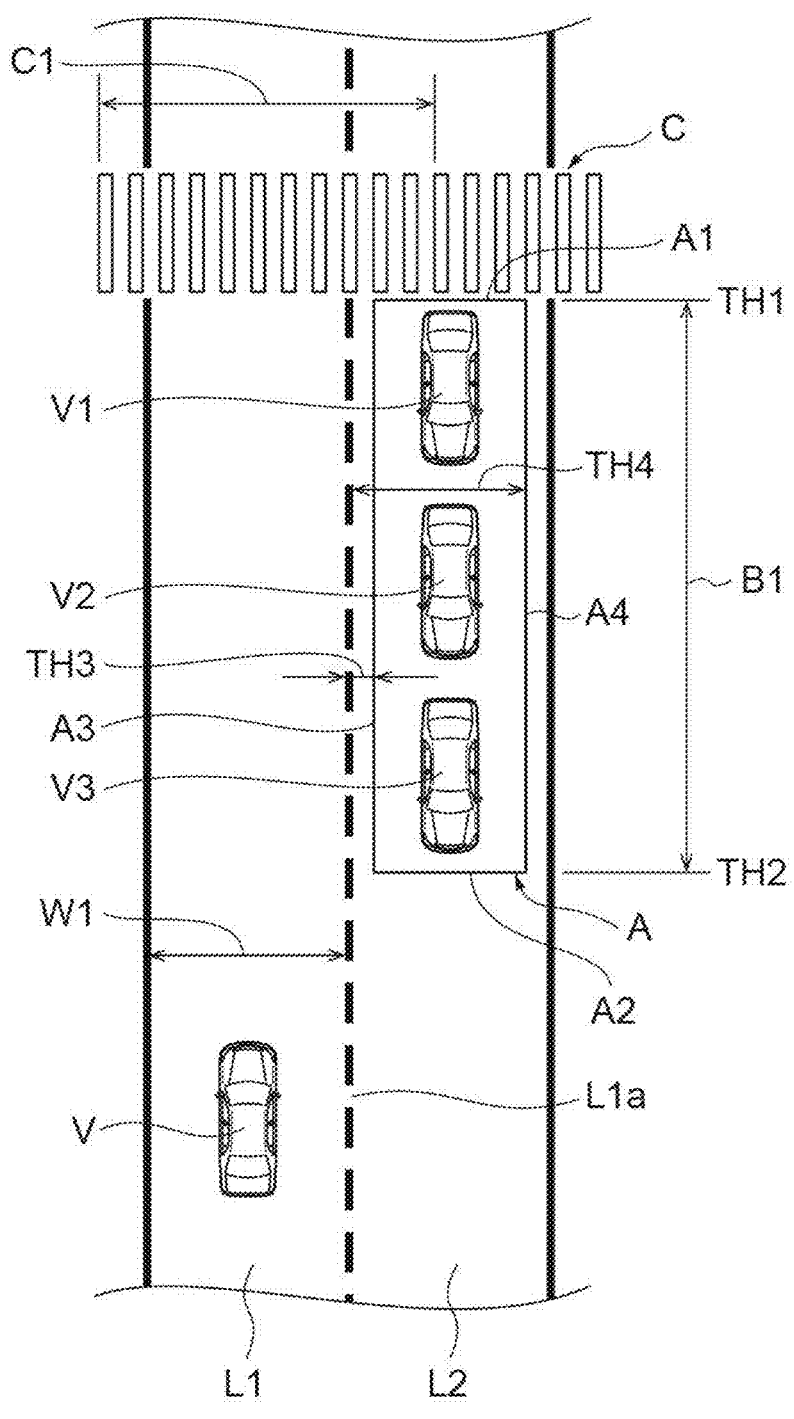
FIG. 2 is a top view showing a vehicle detection area set before a pedestrian crossing.

The driving assistance device 100 shown in FIG. 1 is mounted on the host vehicle V and provides driving assistance for the host vehicle V. In this embodiment, as shown in FIG. 2, the driving assistance device 100 performs driving assistance at a position in front of the pedestrian crossing C that exists ahead of the host vehicle V. The driving assistance device 100 provides driving assistance for the host vehicle V traveling on the own lane L1 in a situation where there is an adjacent oncoming lane L2 adjacent to the own lane L1.

In this embodiment, as shown in FIG. 2, the oncoming lane L2 is situated to the right side of the own lane L1 on which the host vehicle V is traveling. That is, the oncoming lane L2 is an adjacent lane adjacent to the own lane L1. In front of the host vehicle V, there is a pedestrian crossing C that crosses both the own lane L1 and the oncoming lane L2. In front of the pedestrian crossing C, as seen from the host vehicle V, the first oncoming vehicle V1, the second oncoming vehicle V2, and the third oncoming vehicle V3 are traveling on the oncoming lane L2. The first oncoming vehicle V1 is traveling at the position closest to the pedestrian crossing C. The third oncoming vehicle V3 is traveling at the position closest to the host vehicle V. The second oncoming vehicle V2 is traveling at a position between the first oncoming vehicle V1 and the third oncoming vehicle V3. In other words, the first oncoming vehicle V1 to the third oncoming vehicle V3 are other vehicles on the adjacent lane.

Furthermore, in the following description, "in front" means the side closer to the host vehicle V as seen from the host vehicle V. "Behind" means the side farther from the host vehicle V as seen from the host vehicle V. "Longitudinal direction" refers to the direction along the own lane L1 and/or the oncoming lane L2. "Lateral direction" refers to the direction along the lane width of the own lane L1 and/or the oncoming lane L2.

As shown in FIG. 1, the driving assistance device 100 includes a vehicle speed sensor 1, an external sensor 2, an HMI (Human Machine Interface) 3, an actuator 4, and a support ECU (Electronic Control Unit) 10. The vehicle speed sensor 1 is a detector that detects the speed of the host vehicle V. For example, the vehicle speed sensor 1 is provided on the wheel of the host vehicle V or a driveshaft that rotates integrally with the wheel and detects the rotational speed of the wheel. The vehicle speed sensor 1 transmits the vehicle speed information of the host vehicle V to the support ECU 10.

The external sensor 2 is an onboard sensor that detects the external environment of the host vehicle V. The external sensor 2 includes at least a camera. The camera is an imaging device that captures images of the external environment of the host vehicle V. For example, the camera is provided on the backside of the windshield of the host vehicle V and captures images of the front of the vehicle. The camera transmits imaging information (image data) about the external environment of the host vehicle V to the support ECU 10. The camera may be a monocular camera or a stereo camera. Multiple cameras may be provided, and they may capture images of the front as well as the left and right sides of the host vehicle V.

The external sensor 2 may also include a radar sensor. The radar sensor is a detection device that uses radio waves (e.g., millimeter waves) or light to detect objects around the host vehicle V. The radar sensor includes, for example, millimeter-wave radar or LIDAR (Light Detection and Ranging). The radar sensor transmits radio waves or light around the host vehicle V and receives the radio waves or light reflected by objects. The radar sensor transmits the reception results of the reflected radio waves or light to the support ECU 10.

The HMI 3 is an interface for input and output of information between the host vehicle V and the occupants. The HMI 3 has a display or speakers, among other things. The HMI 3 provides driving-related guidance and notifications to the driver.

The actuator 4 is a device used for controlling the travel of the host vehicle V. The actuator 4 includes at least a brake actuator that controls the brakes of the host vehicle V and a steering actuator that controls the steering of the host vehicle V.

The support ECU 10 is an electronic control unit that has a CPU (Central Processing Unit), ROM (Read Only Memory), RAM (Random Access Memory), and other components. The support ECU 10, for example, loads a program recorded in the ROM into the RAM and executes the program loaded in the RAM with the CPU to realize various functions. The support ECU 10 may consist of multiple electronic units. Functionally, the support ECU 10 includes a pedestrian crossing detection unit 11, a lane width acquisition unit 12, a vehicle detection unit 13, and a driving assistance unit 14.

The pedestrian crossing detection unit 11 detects the pedestrian crossing C in front of the host vehicle V. In this embodiment, the pedestrian crossing detection unit 11 can detect the presence of the pedestrian crossing C using pattern matching or image recognition technologies such as Semantic Segmentation based on the imaging information (captured images) from the camera of the external sensor 2. Additionally, the pedestrian crossing detection unit 11 detects the distance to the pedestrian crossing C based on the camera's imaging information. For example, the pedestrian crossing detection unit 11 can detect the distance to the pedestrian crossing C using the Y-coordinate (vertical coordinate) of the captured image or the size of the pedestrian crossing area extracted through image recognition.

The pedestrian crossing detection unit 11 may be configured to detect pedestrian crossings C that exist within a predetermined distance from the host vehicle V. In addition to using camera imaging information, the pedestrian crossing detection unit 11 may also detect the presence of the pedestrian crossing C in front of the host vehicle V and the distance to the pedestrian crossing C based on map information.

Furthermore, the pedestrian crossing detection unit 11 detects the pedestrian crossing length C1, which is the length of the pedestrian crossing C in an extending direction in front of the host vehicle V, based on the imaging information captured by the camera of the external sensor 2. This pedestrian crossing length C1 is the length detected based on the camera's imaging information. In other words, if the pedestrian crossing C is partially obscured by an obstacle and not fully captured in the image, the pedestrian crossing length C1 will be the length of the portion of the pedestrian crossing C that is captured in the image.

Figure 3:
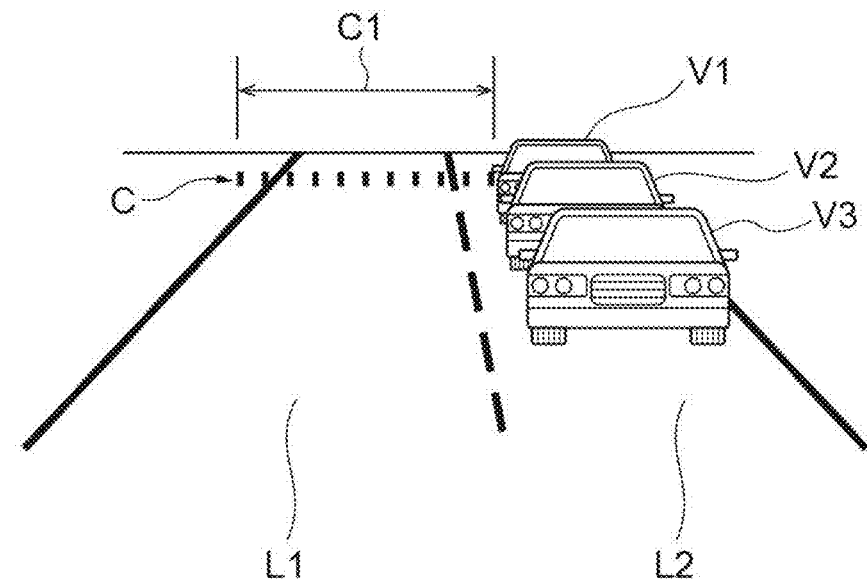
FIG. 3 is a schematic diagram showing a pedestrian crossing viewed from a host vehicle in the presence of a series of oncoming vehicles.

For example, as shown in FIGS. 2 and 3, the first oncoming vehicles V1 to the third oncoming vehicles V3 exist in front of the pedestrian crossing C on the oncoming lane L2. In this case, from the perspective of the host vehicle V, the right side of the pedestrian crossing C is obscured by the first oncoming vehicle V1 and others. Therefore, the pedestrian crossing length C1 detected by the pedestrian crossing detection unit 11 is the length from the left edge of the pedestrian crossing C to the position where the pedestrian crossing C is obscured by the first oncoming vehicle V1 and others.

Figure 4:
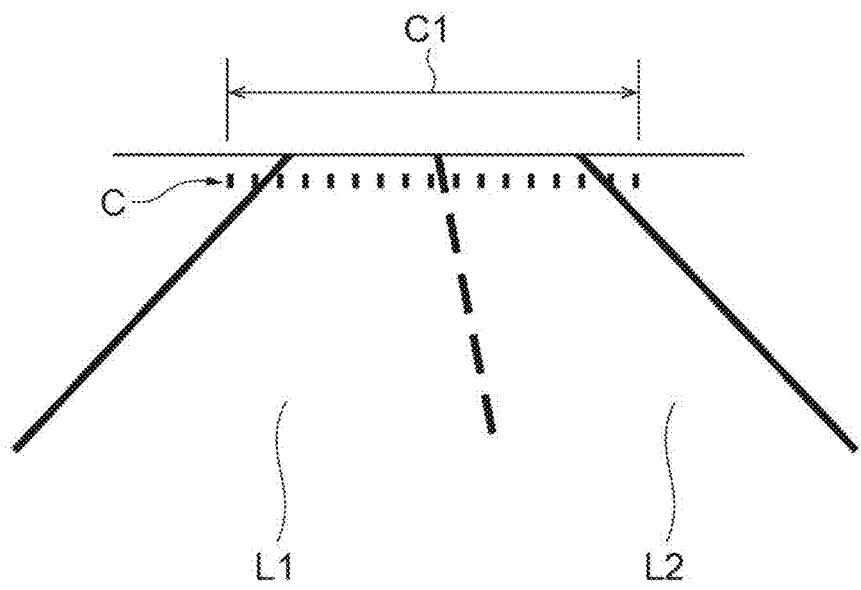
FIG. 4 is a schematic diagram showing a pedestrian crossing viewed from a host vehicle when there is no oncoming vehicle.

As shown in FIG. 4, for example, there may be cases where there are no oncoming vehicles in front of the pedestrian crossing C on the oncoming lane L2 and no leading vehicles in front of the pedestrian crossing C on the own lane L1. In this case, from the perspective of the host vehicle V, the pedestrian crossing C is not obscured by oncoming or leading vehicles. Therefore, the pedestrian crossing detection unit 11 can detect the actual length of the pedestrian crossing C as the pedestrian crossing length C1 based on the camera's imaging information.

For example, the pedestrian crossing detection unit 11 can detect the pedestrian crossing length C1 using image recognition technology based on the camera's imaging information. Here, for instance, the pedestrian crossing detection unit 11 can calculate the pedestrian crossing length C1 using the lateral size (size in the extending direction) of the pedestrian crossing C detected using image recognition technology and the distance to the pedestrian crossing C.

In this embodiment, the pedestrian crossing detection unit 11 detects pedestrian crossings C that do not have traffic lights installed. The pedestrian crossing detection unit 11 may determine the presence of traffic lights using pattern matching or image recognition technology based on the camera's imaging information. Alternatively, the pedestrian crossing detection unit 11 may determine the presence of traffic lights based on the installation information of traffic lights included in map information.

The lane width acquisition unit 12 acquires the lane width W of the own lane L1. The pedestrian crossing detection unit 11 can detect the lane width W using image recognition technology based on the camera's imaging information. Here, for example, the lane width acquisition unit 12 detects the left and right lane markings using edge detection or image recognition technologies such as Semantic Segmentation on the images captured by the camera. The lane width acquisition unit 12 can detect the lane width W based on the distance between the detected left and right lane markings in the image.

The vehicle detection unit 13 detects the presence or absence of other vehicles at a lateral position shifted from the own lane L1. In other words, when other vehicles are detected by the vehicle detection unit 13, it means that there is an adjacent lane adjacent to the own lane L1. Specifically, the vehicle detection unit 13 sets a vehicle detection area in the lateral area of the own lane L1 to detect other vehicles. The vehicle detection unit 13 detects the presence or absence of other vehicles within the set vehicle detection area. The vehicle detection unit 13 also detects the presence or absence of oncoming vehicles within the vehicle detection area with speeds lower than a predetermined vehicle speed threshold. This vehicle speed threshold may be set to values such as 20 km/h or 15 km/h.

In this embodiment, the vehicle detection unit 13 sets the vehicle detection area in front of the pedestrian crossing C detected by the pedestrian crossing detection unit 11. Below, using FIG. 2, the setting of the vehicle detection area A in the right lateral area of the own lane L1 and the detection of oncoming vehicles (other vehicles) will be explained. The vehicle detection unit 13 can set the vehicle detection area A based on the distance to the pedestrian crossing C and the position of the right lane marking L1a of the own lane L1, for example.

The vehicle detection unit 13 can set the rear boundary line A1 and the front boundary line A2 of the vehicle detection area A based on the distance to the pedestrian crossing C detected by the pedestrian crossing detection unit 11. The rear boundary line A1 is the rear edge of the vehicle detection area A. The front boundary line A2 is the front edge of the vehicle detection area A.

The rear boundary line A1 is set at a position at or greater than a predetermined first distance TH1 (e.g., 0 m) from the front edge of the pedestrian crossing C towards the host vehicle V. The front edge of the pedestrian crossing C is the position obtained based on the distance to the pedestrian crossing C detected by the pedestrian crossing detection unit 11. The front boundary line A2 is set at a position at or less than a predetermined second distance TH2 (e.g., 40 m) from the front edge of the pedestrian crossing C towards the host vehicle V. In other words, the longitudinal range of the vehicle detection area A is from the front edge of the pedestrian crossing C towards the host vehicle V, at a range greater than the first distance TH1 and less than the second distance TH2. The longitudinal length B1 of the vehicle detection area A is the length obtained by subtracting the first distance TH1 from the second distance TH2.

The vehicle detection unit 13 can set the left boundary line A3 and the right boundary line A4 of the vehicle detection area A based on the position of the right lane marking L1a of the own lane L1. The right lane marking L1a is the right lane marking of the left and right lane markings that constitute the own lane L1. The vehicle detection unit 13 can detect the right lane marking L1a using the same method as the lane width acquisition unit 12. The left boundary line A3 is the left edge of the left and right edges of the vehicle detection area A as seen from the host vehicle V. The right boundary line A4 is the right edge of the left and right edges as seen from the host vehicle V. The left boundary line A3 is located closer to the right lane marking L1a than the right boundary line A4.

The left boundary line A3 is set at a position at or greater than a predetermined third distance TH3 (e.g., 0.5 m) to the right (towards the oncoming lane L2 side) from the right lane marking L1a. The right boundary line A4 is set at a position at or less than a predetermined fourth distance TH4 (e.g., 3.5 m) to the right (towards the oncoming lane L2 side) from the right lane marking L1a. In this way, as shown in the example in FIG. 2, the vehicle detection unit 13 can set the vehicle detection area A on the oncoming lane L2.

Next, the vehicle detection unit 13 detects the speed of other vehicles around the host vehicle V, the longitudinal distance from the host vehicle V to the other vehicles, and the lateral position of the other vehicles relative to the host vehicle V based on the detection information from the external sensor 2. For example, the vehicle detection unit 13 can detect other vehicles using pattern matching or image recognition technology based on the camera's imaging information. Alternatively, the vehicle detection unit 13 can detect other vehicles using well-known methods based on the reception results of millimeter-wave radar or LIDAR.

Then, the vehicle detection unit 13 extracts other vehicles with speeds lower than a predetermined vehicle speed threshold from all detected other vehicles. The vehicle detection unit 13 can determine whether the extracted other vehicles exist within the vehicle detection area A based on the detected longitudinal distance from the host vehicle V to the other vehicles and the lateral position of the other vehicles relative to the host vehicle V.

There may be cases where multiple other vehicles are traveling in a line on the adjacent lane adjacent to the own lane on which the host vehicle V is traveling. In this case, when looking at the other vehicles on the adjacent lane from the host vehicle V, the areas obscured by the vehicle directly in front become larger for the other vehicles further back as seen from the host vehicle. For example, in the situation shown in FIG. 2, as shown in FIG. 3, from the perspective of the host vehicle V, only a very small part of the first oncoming vehicle V1 is visible because it is obscured by the second oncoming vehicle V2. Also, part of the second oncoming vehicle V2 is obscured by the third oncoming vehicle V3.

When detecting vehicles based on the detection results of the external sensor 2, it is common to detect the object as a vehicle based on the shape of the detected object. In other words, when the vehicle detection unit 13 detects multiple lined-up oncoming vehicles based on the detection results of the external sensor 2, it becomes more difficult to detect the vehicles further back. Therefore, when detecting oncoming vehicles in front of the pedestrian crossing C on the oncoming lane L2, the longer the longitudinal length of the vehicle detection area A, the more likely it is to include even the oncoming vehicles closer to the front as target vehicles for detection. As mentioned above, the closer the oncoming vehicles are to the host vehicle V, the easier they are to see. By setting the longitudinal length of the vehicle detection area A to a certain extent, it is possible to increase the likelihood of detecting oncoming vehicles in front of the pedestrian crossing C on the oncoming lane L2 as oncoming vehicles by the vehicle detection unit 13.

The vehicle detection unit 13 may also detect oncoming vehicles in front of the pedestrian crossing C on the oncoming lane L2 based on the lateral position of the side of the oncoming vehicles. In this case, for example, the vehicle detection unit 13 may detect oncoming vehicles based on whether the position of the right side (the side closer to the own lane L1) of the oncoming vehicles is within the vehicle detection area. When using the lateral position of the side of the oncoming vehicles, the left boundary line A3 of the vehicle detection area may be set at a position at or greater than a predetermined fifth distance TH5 (e.g., 0.5 m) to the right (towards the oncoming lane L2 side) from the right lane marking L1a. Also, the right boundary line A4 may be set at a position at or less than a predetermined sixth distance TH6 (e.g., 1.5 m) to the right (towards the oncoming lane L2 side) from the right lane marking L1a.

The driving assistance unit 14 provides driving assistance for the host vehicle V traveling on the own lane L1. Here, the driving assistance unit 14 performs the driving assistance described below when there is an adjacent lane next to the own lane L1 in the road conditions. The driving assistance unit 14 does not perform driving assistance when there is no adjacent lane next to the own lane L1.

The driving assistance unit 14 can determine the presence of an adjacent lane based on the detection results of other vehicles by the vehicle detection unit 13. Here, the driving assistance unit 14 determines that there is an adjacent lane when the vehicle detection unit 13 detects an oncoming vehicle (other vehicle) within the vehicle detection area A. Additionally, the driving assistance unit 14 may determine the presence of an adjacent lane based on methods other than using the detection results of the vehicle detection unit 13. For example, the driving assistance unit 14 may determine the presence of an adjacent lane based on map information stored in a map storage part or road information obtained from a navigation system. For instance, the driving assistance unit 14 may detect road lane markings based on camera imaging information and determine the presence of an adjacent lane based on the detected lane markings.

Below, the details of the driving assistance performed by the driving assistance unit 14 when there is an adjacent lane in the road conditions are described. The driving assistance unit 14 calculates the reference pedestrian crossing length K based on the lane width W acquired by the lane width acquisition unit 12. The reference pedestrian crossing length K may be calculated by multiplying a predetermined value by the lane width W of the own lane L1.

The driving assistance unit 14 performs driving assistance when the pedestrian crossing length C1 detected by the pedestrian crossing detection unit 11 is shorter than the calculated reference pedestrian crossing length K. In this embodiment, the driving assistance unit 14 also performs driving assistance when the vehicle detection unit 13 detects an oncoming vehicle within the vehicle detection area A with a speed lower than the vehicle speed threshold, and the pedestrian crossing length C1 detected by the pedestrian crossing detection unit 11 is shorter than the calculated reference pedestrian crossing length K. In other words, the driving assistance unit 14 determines the presence of an adjacent lane and whether the speed of other vehicles traveling on the adjacent lane is at the vehicle speed threshold based on the detection results of the vehicle detection unit 13. Then, the driving assistance unit 14 performs driving assistance when there is an adjacent lane, the speed of other vehicles traveling on the adjacent lane is at the vehicle speed threshold, and the pedestrian crossing length C1 is shorter than the reference pedestrian crossing length K.

This driving assistance is to prepare for the situation where pedestrians or others are trying to cross the pedestrian crossing C in areas that become blind spots due to oncoming vehicles on the oncoming lane L2. The driving assistance unit 14 performs at least one of the following as driving assistance: notifying the occupants of the host vehicle V, steering control of the host vehicle V, and deceleration control of the host vehicle V. The driving assistance unit 14 can use the HMI 3 to notify the occupants of the host vehicle V. This notification may be to alert the possibility that pedestrians or others are trying to cross the pedestrian crossing C. The driving assistance unit 14 can use the actuator 4 to perform steering control and deceleration control of the host vehicle V. This steering control may be, for example, to steer the host vehicle V away from the oncoming lane L2 in preparation for pedestrians or others suddenly emerging from behind oncoming vehicles.

The driving assistance unit 14 can perform driving assistance when a predetermined assistance timing condition is met. For example, the assistance timing condition may be determined using the time it takes for the host vehicle V to reach the pedestrian crossing C. For instance, the assistance timing condition may be "the time to reach the pedestrian crossing C is within a predetermined range." In this case, for example, the driving assistance unit 14 calculates the time to reach the pedestrian crossing C based on the distance to the pedestrian crossing C detected by the pedestrian crossing detection unit 11 and the vehicle speed detected by the vehicle speed sensor 1. The driving assistance unit 14 performs driving assistance when the calculated arrival time meets the assistance timing condition. This predetermined assistance timing condition may be, for example, when the time to reach the pedestrian crossing C is 5 seconds or less. The assistance timing condition may be variously predetermined based on the distance to the pedestrian crossing C, not just the time to reach it.

Next, the flow of driving assistance processing performed by the driving assistance device 100 in front of the pedestrian crossing is described. Here, the driving assistance performed by the driving assistance device 100 is assumed for situations where pedestrians or others are trying to cross the pedestrian crossing in the blind spots caused by oncoming vehicles. Here, the driving assistance performed by the driving assistance device 100 is described, but other driving assistance devices may execute different driving assistance.

Figure 5:
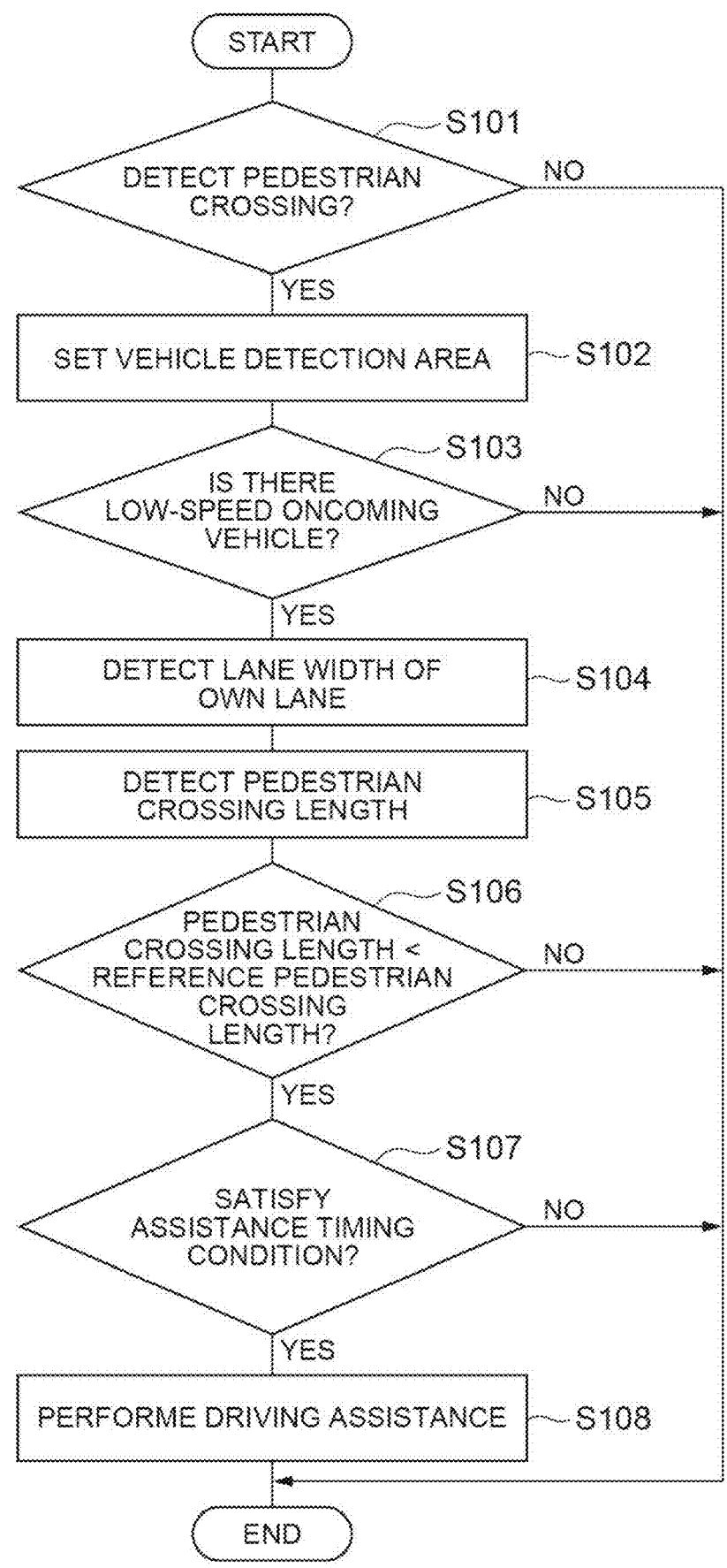
FIG. 5 is a flowchart showing the flow of driving support processing performed in the driving support device.

As shown in FIG. 5, the pedestrian crossing detection unit 11 of the driving assistance device 100 detects the presence of a pedestrian crossing without traffic lights in front of the host vehicle V (S101). Here, if the pedestrian crossing detection unit 11 detects a pedestrian crossing without traffic lights, it also detects the distance to the pedestrian crossing. If no pedestrian crossing without traffic lights is detected (S101: NO), the driving assistance device 100 will start the process again from the beginning after a predetermined time.

If a pedestrian crossing C without traffic lights is detected (S101: YES), the vehicle detection unit 13 sets the vehicle detection area A in front of the pedestrian crossing C on the right side of the own lane L1 (S102). The vehicle detection unit 13 detects the presence of oncoming vehicles (low-speed oncoming vehicles) within the vehicle detection area A with speeds lower than the vehicle speed threshold (S103). If no oncoming vehicles with speeds lower than the vehicle speed threshold are present (S103: NO), the driving assistance device 100 will start the process again from the beginning after a predetermined time.

If there are oncoming vehicles with speeds lower than the vehicle speed threshold (S103: YES), the driving assistance unit 14 determines that there is an oncoming lane L2 adjacent to the own lane L1. Then, the lane width acquisition unit 12 acquires the lane width W of the own lane L1 (S104). The pedestrian crossing detection unit 11 detects the pedestrian crossing length C1 of the pedestrian crossing C in front of the host vehicle V (S105). The driving assistance unit 14 determines whether the pedestrian crossing length C1 is shorter than the reference pedestrian crossing length K (S106). If the pedestrian crossing length C1 is not shorter than the reference pedestrian crossing length K (S106: NO), the driving assistance device 100 will start the process again from the beginning after a predetermined time.

If the pedestrian crossing length C1 is shorter than the reference pedestrian crossing length K (S106: YES), the driving assistance unit 14 determines whether the assistance timing condition based on the distance to the pedestrian crossing C is satisfied (S107). If the assistance timing condition is not satisfied (S107: NO), the driving assistance device 100 will start the process again from the beginning after a predetermined time. If the assistance timing condition is satisfied (S107: YES), the driving assistance unit 14 performs driving assistance for the host vehicle V (S108).

As described above, the driving assistance device 100 calculates the reference pedestrian crossing length K based on the lane width W of the own lane L1. Then, if the pedestrian crossing length C1 of the pedestrian crossing C in front of the host vehicle V is shorter than the reference pedestrian crossing length K, the driving assistance device 100 performs driving assistance for the host vehicle V. Here, when there are oncoming vehicles on the oncoming lane L2, part of the pedestrian crossing C is obscured from the view of the host vehicle V by the oncoming vehicles. In other words, if the detected pedestrian crossing length C1 is short, it can be said that there is a possibility that oncoming vehicles are present. And there is a possibility that pedestrians or others trying to cross the pedestrian crossing are present in the blind spot area caused by the oncoming vehicles. Therefore, the driving assistance device 100 performs driving assistance in advance to prepare for the situation where pedestrians or others are trying to cross the pedestrian crossing C when the pedestrian crossing length C1 is short.

For example, as shown in FIG. 2, there may be cases where multiple other vehicles are traveling in a line on the oncoming lane L2. In such cases, as explained using FIG. 3, the first oncoming vehicle V1, which is closer to the pedestrian crossing C, may be difficult to detect as another vehicle. Therefore, even if the driving assistance device 100 cannot detect other vehicles at the position in front of the pedestrian crossing C, it can still perform driving assistance based on the pedestrian crossing length C1. In this way, the driving assistance device 100 can provide more appropriate driving assistance for the host vehicle V in front of the pedestrian crossing C.

The driving assistance device 100 performs driving assistance for the host vehicle V when an oncoming vehicle is detected within the vehicle detection area A. Here, the vehicle detection area A is set in the lateral area of the own lane L1. In other words, when an oncoming vehicle is detected within the vehicle detection area A, it means that there is an oncoming lane L2 adjacent to the own lane L1. Therefore, the driving assistance device 100 can determine the presence of an oncoming lane based on the detection results of oncoming vehicles within the vehicle detection area A and perform driving assistance when there is an oncoming lane in the road conditions.

For example, there may be cases where the speed of oncoming vehicles on the oncoming lane L2 is high. In such cases, where the speed of oncoming vehicles is high, it can be considered that there are no pedestrians or others trying to cross the pedestrian crossing C. Therefore, the driving assistance unit 14 performs driving assistance when an oncoming vehicle with a speed lower than the vehicle speed threshold is detected within the vehicle detection area A. This allows the driving assistance device 100 to perform driving assistance considering the possibility of the presence of pedestrians or others trying to cross the pedestrian crossing C.

Figure 6:
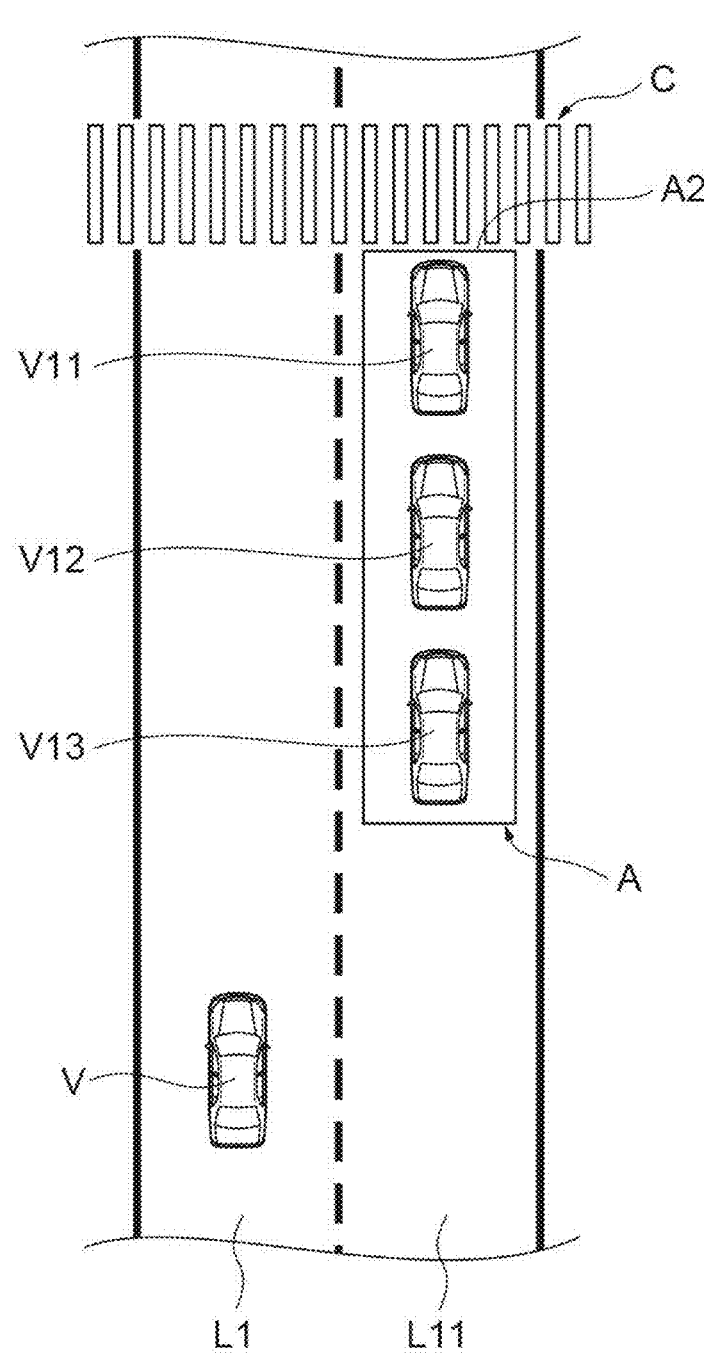
FIG. 6 is a top view showing a road condition according to a modification.

Although the embodiments of the present disclosure have been described above, the present disclosure is not limited to these embodiments. For example, the above embodiments have been described using the case where the oncoming lane L2 exists on the right side of the own lane L1 as an example. However, this is not limiting, and as shown in FIG. 6, the road conditions may be such that an adjacent lane L11 is adjacent to the right side of the own lane L1. This adjacent lane L11 is a lane where vehicles travel in the same direction as the own lane L1. In other words, the host vehicle V is traveling on the left lane (own lane L1) of a two-lane road. In this case, the vehicle detection unit 13 can detect other vehicles V11 to V13 on the adjacent lane L11 by setting the vehicle detection area A to the right side of the own lane L1. Then, the driving assistance unit 14 can determine that there is an adjacent lane L11 in the road conditions when the vehicle detection unit 13 detects other vehicles within the vehicle detection area A.

Additionally, the setting of the vehicle detection area A is not limited to the right lateral area of the own lane L1. The vehicle detection area A may also be set in the left lateral area of the own lane L1.

What is claimed is:

1. A driving assistance device for assisting an operation of a host vehicle traveling on an own lane adjacent to an adjacent lane, comprising:
   at least one processor configured to execute instructions for:
      detecting the length of a pedestrian crossing in an extending direction ahead of the host vehicle, referred to as the pedestrian crossing length, based on imaging information from a camera;
      acquiring a lane width of the own lane; and
      calculating a reference pedestrian crossing length based on the acquired lane width;
      wherein, when the detected pedestrian crossing length is shorter than the calculated reference pedestrian crossing length, performing driving assistance that includes at least one of steering control of the host vehicle, or deceleration control;
      setting a vehicle detection area on a side of the own lane for detecting other vehicles, and detecting the presence or absence of other vehicles within the set vehicle detection area, wherein setting the vehicle detection area comprises setting the vehicle detection area comprising:
         a longitudinal range extending from an edge of the pedestrian crossing closest to the host vehicle toward the host vehicle, and
         a lateral range offset from a lane boundary line of the host lane,
      performing the driving assistance when another vehicle is detected within the vehicle detection area and the detected pedestrian crossing length is shorter than the calculated reference pedestrian crossing length,
      detecting the presence or absence of other vehicles within the vehicle detection area that are traveling at speeds lower than a predetermined vehicle speed threshold, and
      performing the driving assistance when another vehicle below the vehicle speed threshold is detected within the vehicle detection area and the detected pedestrian crossing length is shorter than the calculated reference pedestrian crossing length.

2. The driving assistance device according to claim 1, wherein the at least one processor is configured to execute instructions for performing steering control of the host vehicle to steer the host vehicle away from the adjacent lane.

3. The driving assistance device according to claim 1, wherein the driving assistance further includes notifying the occupants of the host vehicle.

5

\* \* \* \* \*